(12) United States Patent
Karasawa et al.

(10) Patent No.: US 7,755,340 B2
(45) Date of Patent: **\*Jul. 13, 2010**

(54) STEP-UP SWITCHING REGULATOR WITH SOFT START CIRCUITS

(75) Inventors: Shinya Karasawa, Kyoto (JP); Eitaro Oyama, Kyoto (JP); Hiroshi Miyahara, Kyoto (JP)

(73) Assignee: Rohm Co., Ltd. (JP)

( \* ) Notice: Subject to any disclaimer, the term of this patent is extended or adjusted under 35 U.S.C. 154(b) by 177 days.

This patent is subject to a terminal disclaimer.

(21) Appl. No.: 11/995,745

(22) PCT Filed: Jul. 12, 2006

(86) PCT No.: PCT/JP2006/313882

§ 371 (c)(1),
(2), (4) Date: Jan. 15, 2008

(87) PCT Pub. No.: WO2007/010802

PCT Pub. Date: Jan. 25, 2007

(65) Prior Publication Data

US 2009/0146633 A1    Jun. 11, 2009

(30) Foreign Application Priority Data

Jul. 15, 2005   (JP)   ............... 2005-206530

(51) Int. Cl.
*G05F 1/00* (2006.01)
(52) U.S. Cl. .................................... 323/282
(58) Field of Classification Search ............... 323/222, 323/282, 901, 290; 363/127
See application file for complete search history.

(56) References Cited

U.S. PATENT DOCUMENTS 5,568,044 A * 10/1996 Bittner ..................... 323/272
6,538,907 B2 * 3/2003 Hoshino et al. ............... 363/60

(Continued)

FOREIGN PATENT DOCUMENTS

JP       2002-252971 A      9/2002

(Continued)

OTHER PUBLICATIONS

International Search Report for International Application No. PCT/JP2006/313882 mailed Sep. 26, 2006.

(Continued)

*Primary Examiner*—Adolf Berhane
*Assistant Examiner*—Yemane Mehari
(74) *Attorney, Agent, or Firm*—Cantor Colburn LLP

(57) ABSTRACT

A switching transistor has a source connected to the ground and a drain connected to the first terminal. The other end of an inductor whose one end is to be connected to the first terminal is connected to the second terminal. An input voltage is applied to the third terminal. An auxiliary transistor is disposed between the second terminal and the third terminal. A first soft start circuit generates a first soft start voltage that increases with lapse of time, and a second soft start circuit generates a second soft start voltage that increases with a delay to the first soft start voltage. An error amplifier controls the gate voltage of the auxiliary transistor on the basis of the error voltage between the output voltage and the first soft start voltage.

6 Claims, 2 Drawing Sheets

U.S. PATENT DOCUMENTS

| | | | |
|---|---|---|---|
| 6,919,713 B2* | 7/2005 | Hoshino et al. | 323/267 |
| 6,954,056 B2* | 10/2005 | Hoshino et al. | 323/285 |
| 6,969,979 B2* | 11/2005 | Kohout et al. | 323/282 |
| 7,068,016 B2* | 6/2006 | Athari | 323/222 |
| 7,221,129 B2* | 5/2007 | Matsuo et al. | 323/222 |
| 7,397,678 B2* | 7/2008 | Frank et al. | 363/89 |
| 2004/0070376 A1* | 4/2004 | Hoshino et al. | 323/267 |
| 2004/0113600 A1* | 6/2004 | Hoshino et al. | 323/284 |
| 2005/0077882 A1* | 4/2005 | Nishino | 323/222 |
| 2005/0258811 A1* | 11/2005 | Matsuo et al. | 323/282 |
| 2007/0216387 A1* | 9/2007 | Matsuo et al. | 323/282 |
| 2009/0122585 A1* | 5/2009 | Karasawa | 363/127 |
| 2009/0146633 A1* | 6/2009 | Karasawa et al. | 323/290 |

FOREIGN PATENT DOCUMENTS

| | | |
|---|---|---|
| JP | 2003-324941 A | 11/2003 |
| JP | 2004-32875 A | 1/2004 |
| JP | 2004-40859 A | 2/2004 |
| JP | 2005-117784 A | 4/2005 |

OTHER PUBLICATIONS

Written Opinion of the International Searching Authority for PCT/JP2006-313882 mailed Sep. 26, 2006.

* cited by examiner

US 7,755,340 B2

STEP-UP SWITCHING REGULATOR WITH SOFT START CIRCUITS

CROSS REFERENCE TO RELATED APPLICATIONS

This is a U.S. national stage of application No. PCT/JP2006/313882, filed on 12 Jul. 2006. Priority under 35 U.S.C. §119(a) and 35 U.S.C. §365(b) is claimed from Japanese Application No. 2005-206530, filed 15 Jul. 2005, the disclosure of which is also incorporated herein by reference.

BACKGROUND OF THE INVENTION

1. Field of the Invention

The present invention relates to a switching regulator, and more particularly to a control method at the time of the start of a step-up switching regulator.

2. Description of the Related Art

Various electronic apparatus such as a portable phone, a PDA (Personal Digital Assistant), and a notebook-type personal computer of recent years have numerous devices that operate at different power supply voltages, such as light-emitting diodes (hereafter referred to as LED) disposed as a back light unit for a liquid crystal, microprocessors, and other analog and digital circuits.

On the other hand, an electronic apparatus like this has a battery such as a lithium ion battery mounted thereon as a power source. In order to supply the voltage output from a lithium ion battery to a device that operates at a different power supply voltage, one makes use of a DC/DC converter such as a switching regulator that boosts or lowers the power supply voltage.

For the step-up or step-down switching regulators, there are a method that uses a diode for rectification (hereafter referred to as a diode rectification method) and a method that uses a synchronized rectification transistor instead of a diode (hereafter referred to as a synchronized rectification method). The former case provides an advantage in that a high efficiency is obtained when a load current that flows through a load is small. However, this necessitates use of a diode in addition to an inductor and a capacitor on the outside of the control circuit, thereby increasing the circuit area. In the latter case, the efficiency obtained when the current supplied to the load is small will be inferior to that of the former. However, since one makes use of a transistor instead of a diode, it can be integrated in the inside of the LSI, thereby achieving scale reduction as a circuit area including the peripheral components.

Here, in the step-up switching regulator of the diode rectification method or the synchronized rectification method, a transistor for synchronized rectification and an inductor are connected in series between the input terminal receiving an input of the battery voltage and the output terminal outputting the boosted voltage (hereafter referred to as an output voltage). When a P-channel MOSFET is used for the synchronized rectification transistor and the back gate thereof is connected to the source (or the drain), there is a problem in that an electric current flows to the load via a body diode (parasitic diode) between the back gate and the drain (or the source) and the inductor even in a state in which the voltage-boosting operation is stopped by turning off the synchronized rectification transistor.

[Patent Document 1] Japanese Patent Application (Laid Open) No. 2004-32875

[Patent Document 2] Japanese Patent Application (Laid Open) No. 2002-252971

In order to prevent the current flowing to the load via the synchronized rectification transistor and the inductor during the stoppage of the voltage-boosting operation, one can consider a method of disposing a DC (direct current)-block transistor as a switching element on this current path. However, when this DC-block transistor is rapidly turned on, there will be a problem in that an inrush current flows.

SUMMARY OF THE INVENTION

The present invention has been made in view of such problems, and a general purpose thereof is to provide a step-up switching regulator with restrained inrush current at the time of the start.

One embodiment of the present invention relates to a control circuit for controlling a step-up switching regulator. This control circuit includes a switching transistor having one end connected to the ground; a first terminal to which the other end of the switching transistor is connected; a second terminal to which the other end of an inductor whose one end is to be connected to the first terminal is connected; a third terminal to which an input voltage is applied; an auxiliary transistor disposed between the second terminal and the third terminal; a first soft start circuit that generates a first soft start voltage that increases with lapse of time; a second soft start circuit that generates a second soft start voltage that increases with a delay to the first soft start voltage; an error amplifier that controls a voltage of a control terminal of the auxiliary transistor on the basis of an error voltage between the output voltage of the step-up switching regulator and the first soft start voltage; a pulse width modulator that receives an input of the output voltage of the step-up switching regulator and a voltage obtained by shifting the second soft start voltage by a predetermined voltage, and generates a pulse width modulation signal whose duty ratio is controlled so that the two voltages will be approximated to each other; and a driver circuit that drives the switching transistor on the basis of the pulse width modulation signal.

The auxiliary transistor is used as a switch for preventing the DC during the stoppage of the voltage boosting, and further constitutes a linear regulator together with the error amplifier that controls the voltage of the control terminal thereof. Here, the control terminal refers to a terminal corresponding to the gate of the MOSET and the base of the bipolar transistor. According to this embodiment, at the time of the start of the step-up switching regulator, the output voltage is mildly started by the linear regulator on the basis of the first soft start voltage, and thereafter the boosted output voltage can be mildly started on the basis of the second soft start voltage, thereby restraining the generation of inrush current.

The second soft start circuit may include a level shift circuit that shifts the first soft start voltage that is output from the first soft start circuit, to a lower voltage side by a predetermined level.

In order to generate a soft start voltage, one must use a time-constant circuit using a capacitor, a D/A converter, and the like. Therefore, by generating the first soft start voltage and the second soft start voltage with use of one soft start circuit, the circuit area can be reduced.

The switching transistor may be an N-channel MOSFET (Metal Oxide Semiconductor Field Effect Transistor), and the auxiliary transistor may be a P-channel MOSFET.

The control circuit may be monolithically integrated on one semiconductor substrate. Here, the term "monolithically integrated" herein referred to includes a case in which all of the constituent elements of the circuit are formed on the semiconductor substrate and a case in which principal constituent elements of the circuit are integrated. Also, for adjustment of the circuit constants, part of the resistors, the capacitors, and the like may be disposed outside of the semiconductor substrate.

Another embodiment of the present invention is a step-up switching regulator. This step-up switching regulator includes a control circuit described above; an inductor that is disposed between the first terminal and the second terminal of the control circuit; a rectification diode having an anode connected to the first terminal; and an output capacitor that is connected between a cathode of the rectification diode and the ground. The step-up switching regulator outputs a voltage of a connection point between the cathode of the rectification diode and the output capacitor, as the output voltage.

According to this embodiment, the current flowing via the inductor and the rectification diode can be shut off by the auxiliary transistor. Also, one can prevent the inrush current flowing into the output capacitor at the time of the start.

Still another embodiment of the present invention is an electronic apparatus. This electronic apparatus includes a battery; a step-up switching regulator described above that boosts a voltage of the battery; and a light-emitting element that is driven by the step-up switching regulator.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
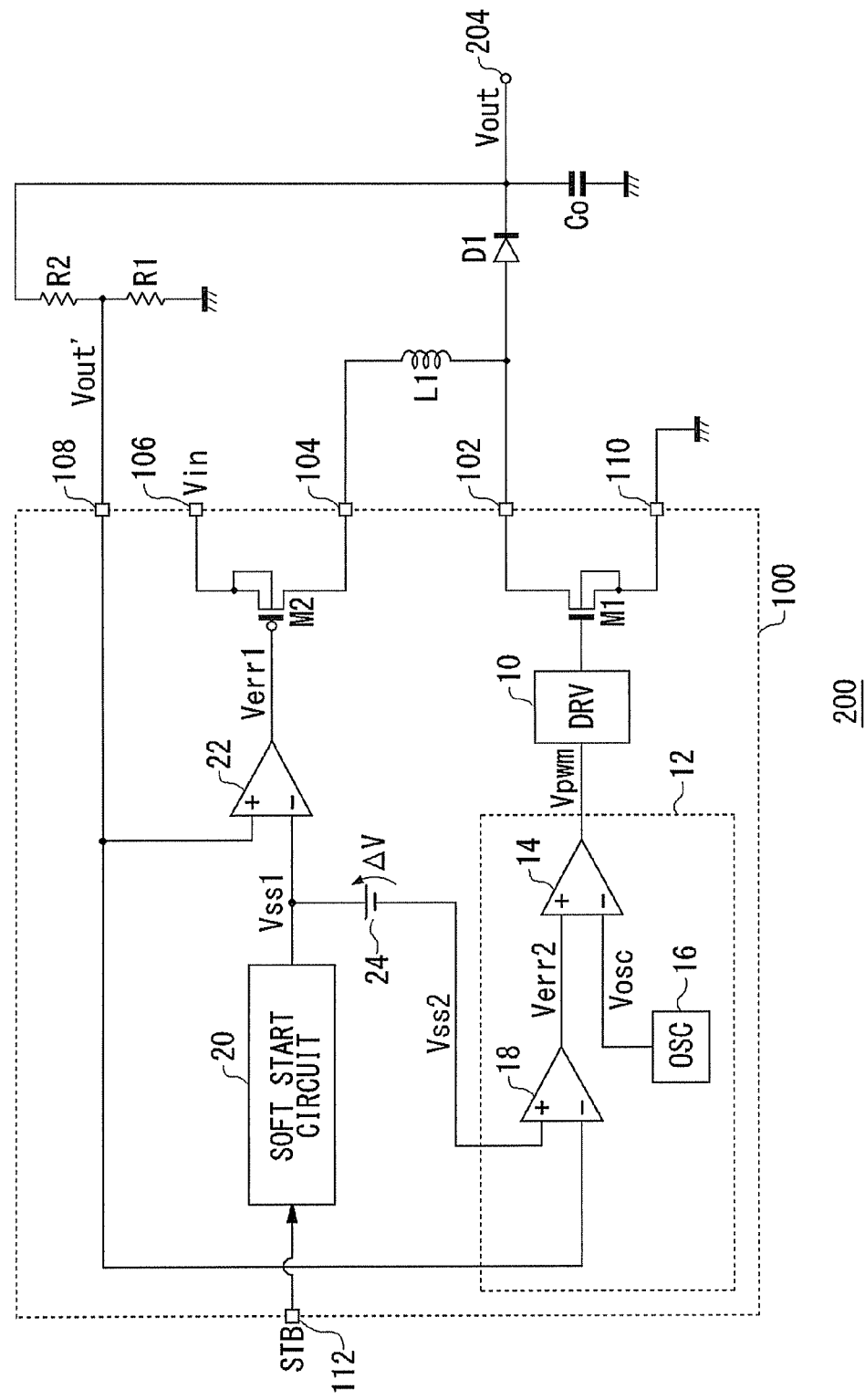
FIG. 1 is a circuit diagram showing a construction of a step-up switching regulator according to an embodiment.

FIG. 1 is a circuit diagram showing a construction of a step-up switching regulator 200 according to an embodiment. The step-up switching regulator 200 is a switching regulator of the diode rectification method including a control circuit 100, an inductor L1, an output capacitor Co, a rectification diode D1, a first resistor R1, and a second resistor R2.

The step-up switching regulator 200 according to the present embodiment boosts an input voltage Vin by a predetermined voltage step-up ratio, and outputs an output voltage Vout from an output terminal 204.

First, the construction of the control circuit 100 will be described. The control circuit 100 includes a first terminal 102, a second terminal 104, a third terminal 106, a voltage feedback terminal 108, a ground terminal 110, and a standby terminal 112 as input and output terminals. Also, in the inside thereof, the control circuit 100 includes a switching transistor M1, an auxiliary transistor M2, a driver circuit 10, a pulse width modulator 12, a soft start circuit 20, an error amplifier 22, and a level shift circuit 24.

The ground terminal 110 is connected to the ground potential on the outside. The switching transistor M1 is an N-channel MOSFET and has a source that is grounded via the ground terminal 110. The drain of the switching transistor M1 is connected to the first terminal 102. One end of the inductor L1 on the outside is connected to this first terminal 102. The other end of the inductor L1 whose one end is to be connected to the first terminal 102 is connected to the second terminal 104. The input voltage Vin is applied from the outside to the third terminal 106.

The auxiliary transistor M2 has a drain connected to the second terminal 104 and has a source connected to the third terminal 106. A feedback voltage Vout' obtained by voltage division of the output voltage Vout of the step-up switching regulator 200 by the first resistor R1 and the second resistor R2 is fed back to the voltage feedback terminal 108. The feedback voltage Vout' is given by Vout'=Vout×R1/(R1+R2). The feedback voltage Vout' is input into the error amplifier 22 and the pulse width modulator 12.

The soft start circuit 20 generates a first soft start voltage Vss1 that increases with lapse of time. A standby signal STB is input into this soft start circuit 20 via the standby terminal 112. When the standby signal STB changes from a low level to a high level, the soft start circuit 20 gradually raises the first soft start voltage Vss1 from 0 V to a predetermined maximum voltage Vmax.

The first soft start voltage Vss1 is input to the inverting input terminal of the error amplifier 22, and the feedback voltage Vout' is input to the non-inverting input terminal. The error amplifier 22 outputs an error voltage Verr1, which is obtained by amplification of the error between the first soft start voltage Vss1 and the feedback voltage Vout', to the gate which is the control terminal of the auxiliary transistor M2. Since this error amplifier 22 and the auxiliary transistor M2 constitute a linear regulator, the feedback is carried out so that the feedback voltage Vout' will be approximated to the first soft start voltage Vss1, and the output voltage Vout is stabilized with Vss1×(R1+R2)/R1 as a target value.

The level shift circuit 24 generates a second soft start voltage Vss2 obtained by shifting the first soft start voltage Vss1 that is output from the soft start circuit 20 to the lower voltage side by a predetermined level ΔV. The second soft start voltage Vss2 is input into the pulse width modulator 12. This second soft start voltage Vss2 increases with a time delay to the first soft start voltage Vss1.

The feedback voltage Vout' and the second soft start voltage Vss2 are input into the pulse width modulator 12. The feedback voltage Vout' is input into the inverting input terminal of the error amplifier 18, and the second soft start voltage Vss2 is input into the non-inverting input terminal of the error amplifier 18. The error amplifier 18 amplifies the error between the feedback voltage Vout' and the second soft start voltage Vss2, and outputs the error voltage Verr2 to the non-inverting input terminal of the PWM comparator 14. The oscillator 16 generates a periodic voltage Vosc having a triangular wave form or a saw (ramp) wave form, and outputs it to the inverting input terminal of the PWM comparator 14. The PWM comparator 14 compares the error voltage Verr2 with the periodic voltage Vosc, and outputs a pulse width modulation signal (hereafter referred to as a PWM signal) Vpwm that will be at a low level when Vosc>Verr2 holds and will be at a high level when Vosc<Verr2 holds. The duty ratio of this PWM signal Vpwm is adjusted so that the feedback voltage Vout' will be approximated to the second soft start voltage Vss2.

The driver circuit 10 drives the switching transistor M1 on the basis of the PWM signal Vpwm that is output from the pulse width modulator 12. The on-time of the switching transistor M1 is controlled based on the duty ratio of the PWM signal Vpwm.

An inductor L1, a rectification diode D1, and an output capacitor Co are connected as follows to the control circuit 100. The inductor L1 is disposed between the first terminal 102 and the second terminal 104 of the control circuit 100. The anode of the rectification diode D1 is connected to the first terminal 102. The output capacitor Co is connected between the cathode of the rectification diode D1 and the ground. The voltage at the connection point between the cathode of the rectification diode D1 and the output capacitor Co is supplied to the load as an output voltage Vout of the step-up switching regulator 200.

Figure 2A:
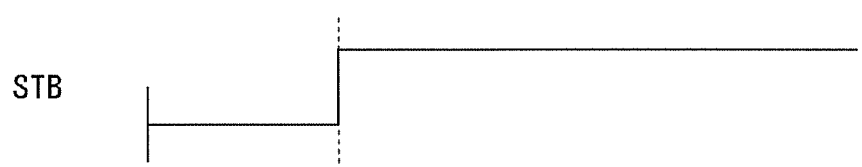
FIGS. 2A to 2C are time charts at the time of the start of the step-up switching regulator of FIG. 1.
Figure 2B:
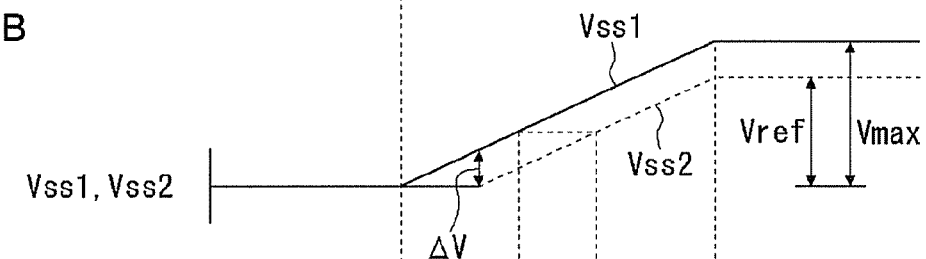
Figure 2C:
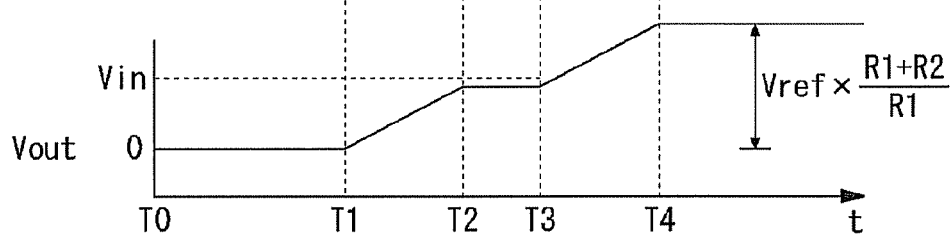

The operation of the step-up switching regulator 200 that is constructed as shown above will be described. FIGS. 2A to 2C are time charts at the time of the start of the step-up switching regulator 200 of FIG. 1. In FIGS. 2A to 2C, the longitudinal axis and the lateral axis are shown by being suitably enlarged or diminished for simplifying the description. FIG. 2A shows a standby signal STB that is input into the control circuit 100 from the outside. FIG. 2B shows the first soft start voltage Vss1 and the second soft start voltage Vss2. FIG. 2C shows the output voltage Vout of the step-up switching regulator 200.

During the period between the time T0 to the time T1, the standby signal STB is at a low level, and the step-up switching regulator 200 is in a rest state. During this period, the first soft start voltage Vss1 is 0V, and the second soft start voltage Vss2 is also 0V. When the first soft start voltage Vss1 is 0V, the error voltage Verr1 that is output from the error amplifier 22, that is, the gate voltage of the auxiliary transistor M2, has risen near to the power supply voltage, so that the auxiliary transistor M2 is in a fully off state. By turning the auxiliary transistor M2 fully off, the current path from the third terminal 106 through the auxiliary transistor M2, the inductor L1, and the rectification diode D1 to the output terminal 204 is shut off.

Also, during the period from the time T0 to the time T1, the second soft start voltage Vss2 is also 0V, so that the duty ratio of the PWM modulation signal Vpwm is 0%, so that the switching operation of the switching transistor M1 is stopped.

When the standby signal STB rises to a high level at the time T1, the soft start circuit 20 raises the first soft start voltage Vss1 from 0V gradually with lapse of time. As a result of this, the auxiliary transistor M2 changes gradually from the fully off state to the on-state, and the output voltage Vout will rise so as to satisfy Vout=Vss1×(R1+R2)/R1 in accordance with the rise of the first soft start voltage Vss1. When the auxiliary transistor M2 goes into the fully on state and the output voltage Vout rises near to the input voltage Vin that is input to the third terminal 106 at the time T2, the output voltage Vout will no longer rise above that level.

Also, since the second soft start voltage Vss2 is a voltage obtained by shifting the first soft start voltage Vss1 to the lower voltage side by ΔV as described above, the second soft start voltage Vss2 will start to rise at the time T1' which is a time after a predetermined delay time τ has passed from the time T1. The pulse width modulator 12 of the step-up switching regulator 200 adjusts the duty ratio of the PWM signal Vpwm so that the feedback voltage Vout' will be equal to the second soft start voltage Vss2. However, during the period from the time T1' to the time T2, the target value of the output voltage of the step-up switching regulator that is given by Vss2×(R1+R2)/R1 is lower than the input voltage Vin, so that the voltage boosting operation is not carried out.

When the target value of the output voltage of the step-up switching regulator that is defined by the second soft start voltage Vss2 rises above the input voltage Vin at the time T3, the duty ratio of the PWM signal Vpwm that is output from the pulse width modulator 12 will increase with lapse of time, and the switching transistor M1 is driven by the driver circuit 10, whereby the voltage boosting operation is controlled so that the output voltage Vout will be approximated to the target voltage given by Vss2×(R1+R2)/R1. As a result, in accordance with the rise of the second soft start voltage Vss2, the output voltage Vout will gradually rise. When time passes and the second soft start voltage Vss2 reaches the target reference voltage given by Vref=Vmax−ΔV at the time T4, the soft start operation is completed, and the output voltage Vout is stabilized.

As shown above, the construction and the operation of the step-up switching regulator 200 according to the present embodiment has been described. With the step-up switching regulator 200 according to the present embodiment, by using the auxiliary transistor M2 as a DC-block switch before the start of the voltage boosting operation, one can prevent the current from flowing to the load via the inductor L1 and the rectification diode D1, or can prevent the input voltage Vin from appearing at the output terminal 204.

Further, during the start of the step-up switching regulator 200, by allowing this auxiliary transistor M2 and the error amplifier 22 to function as a linear regulator, the output voltage Vout can be gradually raised during the period until the output voltage Vout rises near to the input voltage Vin. Namely, according to a conventional step-up switching regulator, the output voltage Vout rises to the input voltage Vin at the time point when the input voltage Vin is given. With the step-up switching regulator 200 according to the present embodiment, however, the output voltage Vout can be gradually raised from 0V.

Further, when the output voltage Vout rises near to the input voltage Vin, the auxiliary transistor M2 will be in a fully on state, and a voltage close to the input voltage Vin will appear at the second terminal 104. Thereafter, the input voltage Vin appearing at the second terminal 104 will be boosted by the step-up switching regulator 200. At this time, the second soft start voltage Vss2 that is input into the error amplifier 18 will rise with lapse of time, so that also the output voltage Vout can be gradually raised with lapse of time. In this manner, by raising the output voltage Vout mildly from 0V to a predetermined target voltage, the inrush current at the time of the start can be restrained.

Figure 3:
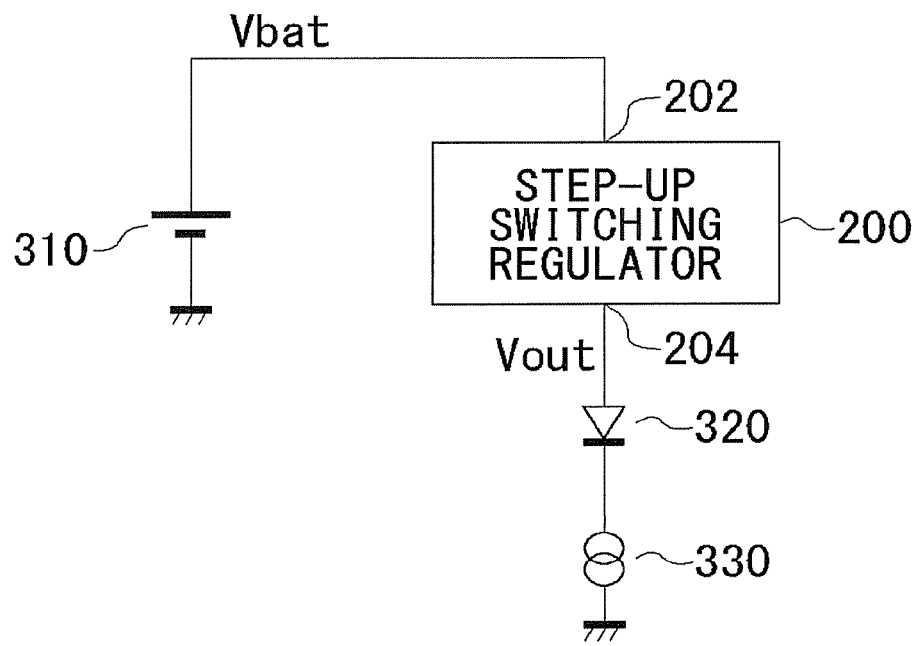
FIG. 3 is a block diagram showing a construction of an electronic apparatus on which the step-up switching regulator of FIG. 1 is mounted.

FIG. 3 is a block diagram showing a construction of an electronic apparatus 300 on which the step-up switching regulator 200 of FIG. 1 is mounted. The electronic apparatus 300 is a small information apparatus of battery driving type such as a portable phone terminal, a digital still photograph camera, or a CD player, and includes a battery 310, a light-emitting element 320, and a step-up switching regulator 200. The battery 310 is, for example, a lithium ion battery, and outputs a battery voltage Vbat of about 3V to 4V. The battery voltage Vbat is input to the input terminal 202 of the step-up switching regulator 200. This input terminal 202 corresponds to the third terminal 106 of FIG. 1, and the battery voltage Vbat corresponds to the input voltage Vin of FIG. 1. The step-up switching regulator 200 performs a voltage boosting operation using the battery voltage Vbat as an input voltage Vin, and supplies an output voltage Vout to the light-emitting element 320 connected to the output terminal 204.

The light-emitting element 320 is, for example, a LED that is disposed as a back light unit for liquid crystal, a flash unit of a camera, or for illumination, and the anode of the light-emitting element 320 is connected to the output terminal 204 of the step-up switching regulator 200. A constant-current circuit 330 for controlling the luminescence brightness of the light-emitting element 320 is connected to the cathode of the light-emitting element 320. The luminescence brightness of the light-emitting element 320 is controlled by the constant current that is generated by the constant-current circuit 330. The step-up switching regulator 200 of FIG. 1 can be suitably used in such an electronic apparatus 300.

The above-described embodiments are merely an exemplification, and it will be understood by those skilled in the art that various modifications can be made on the combination of those constituent elements and treating processes, and that such modifications are also within the scope of the present invention.

In the embodiments, the first soft start voltage Vss1 and the second soft start voltage Vss2 are generated by the soft start circuit 20 and the level shift circuit 24. However, the present invention is not limited to this alone, so that two soft start circuits can be used for generating the first soft start voltage Vss1 and the second soft start voltage Vss2. In this case, since the first soft start voltage Vss1 and the second soft start voltage Vss2 can be independently controlled, a more flexible soft start can be carried out.

In the embodiment, description has been made on a case in which the control circuit 100 is integrated into one LSI. However, the present invention is not limited to this alone, so that part of the constituent elements may be disposed as discrete elements or chip components on the outside of the LSI, or may be constituted with a plurality of LSIs.

Also, in the present embodiment, the setting of the logic values of high level and low level is one example, so that the setting can be freely changed by suitably inverting with use of an inverter or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit for controlling a step-up switching regulator, comprising:
   a switching transistor having one end connected to the ground;
   a first terminal to which the other end of said switching transistor is connected;
   a second terminal to which the other end of an inductor whose one end is to be connected to said first terminal is connected;
   a third terminal to which an input voltage is applied;
   an auxiliary transistor disposed between said second terminal and said third terminal;
   a first soft start circuit that generates a first soft start voltage that increases with lapse of time;
   a second soft start circuit that generates a second soft start voltage that increases with a delay to said first soft start voltage;
   an error amplifier that controls a voltage of a control terminal of said auxiliary transistor on the basis of an error voltage between the output voltage of said step-up switching regulator and said first soft start voltage;
   a pulse width modulator that receives an input of the output voltage of said step-up switching regulator and a voltage obtained by shifting said second soft start voltage by a predetermined voltage, and generates a pulse width modulation signal whose duty ratio is controlled so that the two voltages will be approximated to each other; and
   a driver circuit that drives said switching transistor on the basis of said pulse width modulation signal.

2. The control circuit according to claim 1, wherein said second soft start circuit includes a level shift circuit that shifts said first soft start voltage that is output from said first soft start circuit, to a lower voltage side by a predetermined level.

3. The control circuit according to claim 1, wherein said switching transistor is an N-channel MOSFET (Metal Oxide Semiconductor Field Effect Transistor), and said auxiliary transistor is a P-channel MOSFET.

4. The control circuit according to claim 1, the circuit being monolithically integrated on one semiconductor substrate.

5. A step-up switching regulator comprising:
   a control circuit according to claim 1;
   an inductor that is disposed between said first terminal and said second terminal of said control circuit;
   a rectification diode having an anode connected to said first terminal; and
   an output capacitor that is connected between a cathode of said rectification diode and the ground, wherein
   the step-up switching regulator outputs a voltage of a connection point between the cathode of said rectification diode and said output capacitor, as the output voltage.

6. An electronic apparatus comprising:
   a battery;
   a step-up switching regulator according to claim 5 that boosts a voltage of said battery; and
   a light-emitting element that is driven by said step-up switching regulator.

* * * * *